United States Patent [19]

Kamiyama et al.

[11] Patent Number: 5,439,033
[45] Date of Patent: Aug. 8, 1995

[54] METHOD OF LINING A BRANCH PIPE

[75] Inventors: Takao Kamiyama, Hiratsuka; Yasuhiro Yokoshima, Ibaraki; Shigeru Endoh, Kasukabe, all of Japan

[73] Assignees: Shonan Gosei-Jushi Seisakusho K.K.; Yokoshima & Company; Get Inc., all of Japan

[21] Appl. No.: 275,112

[22] Filed: Jul. 14, 1994

[30] Foreign Application Priority Data

Sep. 28, 1993 [JP] Japan .................................. 5-240778

[51] Int. Cl.[6] ............................................. F16L 55/16
[52] U.S. Cl. ........................ 138/98; 138/97; 156/287
[58] Field of Search ............... 138/98, 97; 405/150.1; 156/287; 264/267; 29/402.09

[56] References Cited

U.S. PATENT DOCUMENTS

| | | | |
|---|---|---|---|
| 4,368,091 | 1/1983 | Ontsuga et al. | 156/287 |
| 4,581,085 | 4/1986 | Wood | 138/97 X |
| 4,714,095 | 12/1987 | Muller et al. | 138/98 |
| 4,724,108 | 2/1988 | Jurgenlohmann et al. | 138/98 X |
| 4,752,511 | 6/1988 | Driver | 138/98 X |
| 4,758,454 | 7/1988 | Wood | 138/98 X |
| 4,836,715 | 6/1989 | Wood | 138/98 X |
| 5,329,063 | 7/1994 | Endoh | 138/98 |

Primary Examiner—David A. Scherbel
Assistant Examiner—Patrick F. Brinson
Attorney, Agent, or Firm—Whitham, Curtis, Whitham & McGinn

[57] ABSTRACT

A branch pipe lining method ensures a reliable air-tight connection between a branch pipe liner bag and a fluid pressure sealing nozzle with a simple structure so that the branch pipe liner bag can be inserted into a branch pipe without fail. A branch pipe liner bag impregnated with a hardenable resin and having a flange at one end thereof is used for the branch pipe repair. The flange of the branch pipe liner bag is folded out to be mounted to a fluid pressure sealing nozzle. A close contact between the flange and the fluid pressure sealing nozzle is held by vacuum pressure. The branch pipe liner bag is then everted and inserted from a main pipe into a branch pipe toward the ground by a fluid pressure. The branch pipe liner bag is pressed onto the inner wall of the branch pipe by a fluid pressure, and the hardenable resin impregnated in the branch pipe liner bag is hardened while the bag itself is kept pressed onto the inner wall of the branch pipe. In this manner, since an air-tight connection between the branch pipe liner bag and the fluid pressure sealing nozzle can be reliably provided by vacuum pressure, a high sealability is ensured between them with a simple structure, whereby the branch pipe liner bag is reliably inserted into the branch pipe.

14 Claims, 9 Drawing Sheets

METHOD OF LINING A BRANCH PIPE

BACKGROUND OF THE INVENTION

1. Field of the Invention

The present invention relates to pipe lining techniques, and more particularly to a method of lining or repairing an aged or defective branch pipe which is conducted by using a pipe liner bag.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to the method described in the above-mentioned publication, the pipe repair method comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of procedure shall be called "everting".) When the entire length of the tubular liner bag is everted (i.e., turned inside out) into the pipe, the control rope holds the closed end of the tubular liner bag to thereby control the length of the tubular liner in the pipe. Then, the everted tubular liner is pressed against the inner wall of the pipe by the pressurized fluid, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

Figure 6:
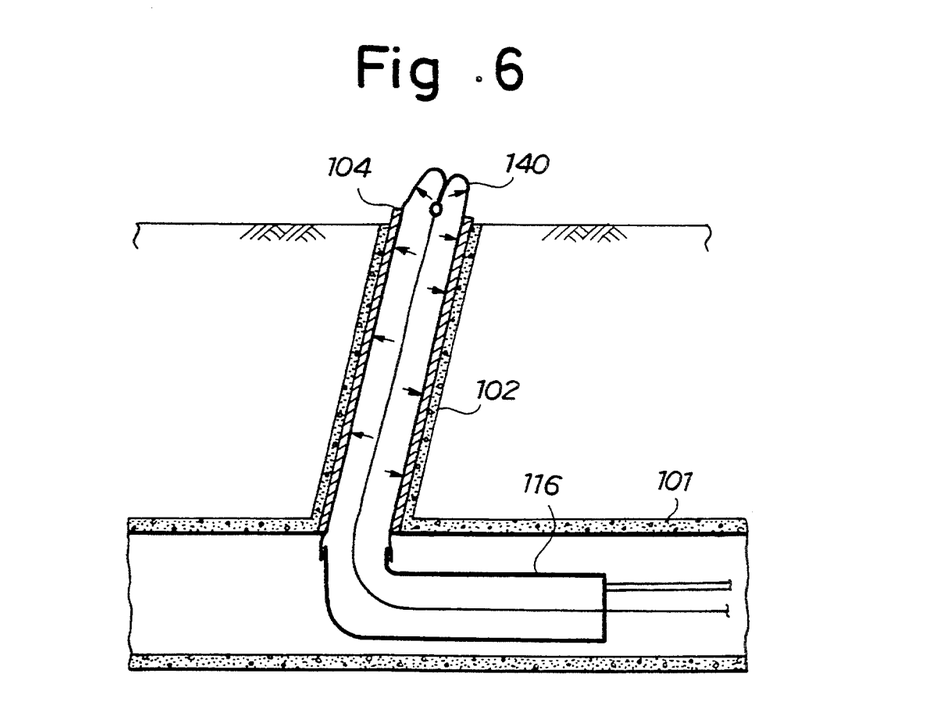
FIG. 6 is a cross-sectional view showing a conventional branch pipe lining method.

The above-mentioned method may also be applied to the lining of a branch pipe which is branched from a main pipe, an example of which is illustrated in FIG. 6.

FIG. 6 is a cross-sectional view showing a conventional method of lining a branch pipe. A pressure bag 116 for everting a branch pipe liner bag 104 is inserted into a main pipe 101. A branch pipe 102 to be repaired is branched from the main pipe 101 as illustrated. Since this pressure bag 116 must be separated from the branch pipe liner bag 104, a sealing tube 140 should be connected to the pressure bag 116 in order to apply a pressure to the branch pipe liner bag 104.

Then, the pressure bag 116 is supplied with compressed air to evert both the sealing tube 140 and the branch pipe liner bag 104 into the branch pipe 102. While the illustrated state is being maintained, the branch pipe liner bag 104 is, for example, heated to harden a hardenable resin impregnated therein. Thereafter, when the sealing tube 140 is pulled out from the branch pipe 102 (branch pipe liner bag 104), the branch pipe 102 is reinforced by the hardened branch pipe liner bag 104 which has been lined on the inner wall of the branch pipe 102.

The above-mentioned method, however, must prepare the sealing tube 140 of an appropriate size in accordance with the length of the branch pipe 102 to be repaired each time the lining is performed. Therefore, the sealing tube 140 must be exchanged for each branch pipe according to its length.

Figure 7:
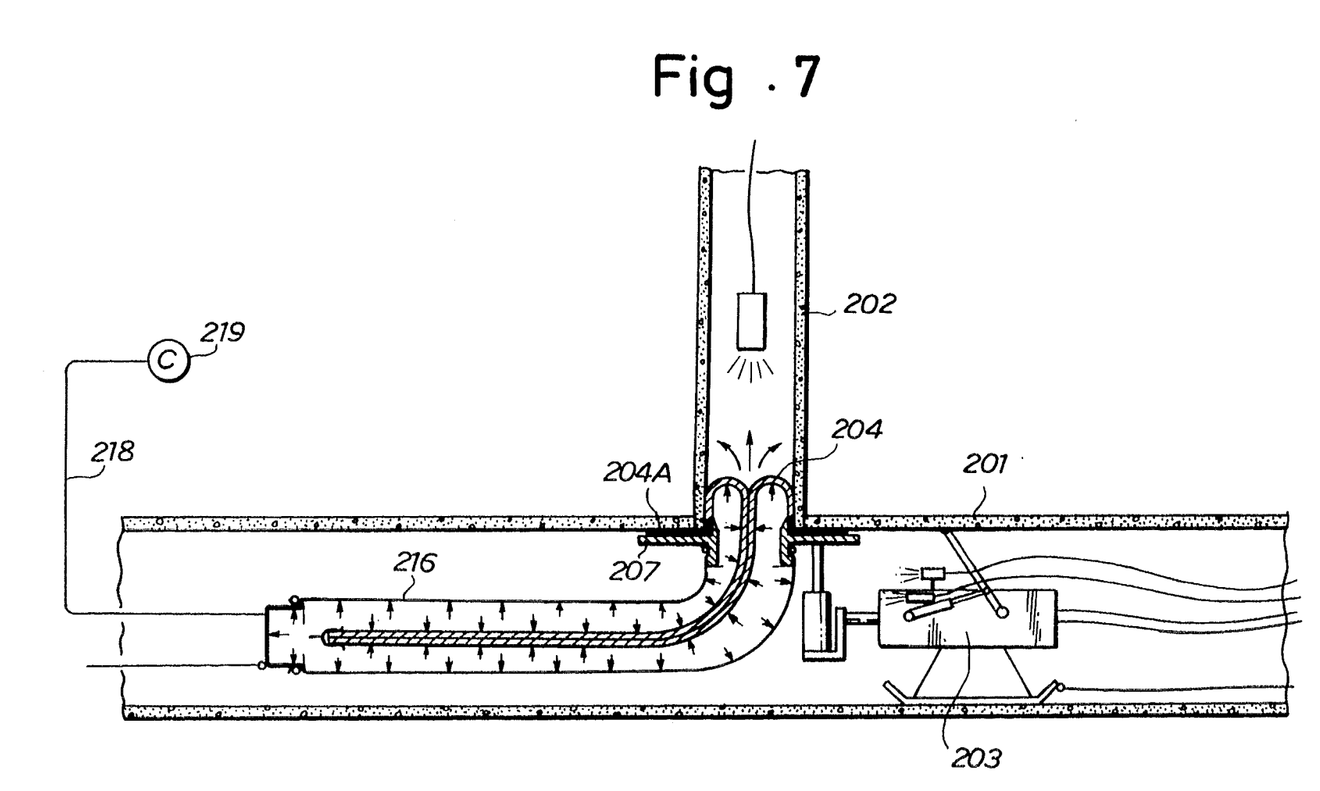
FIGS. 7-9 are cross-sectional views showing another conventional branch pipe lining method for solving a problem inherent to the method of FIG. 6.
Figure 8:
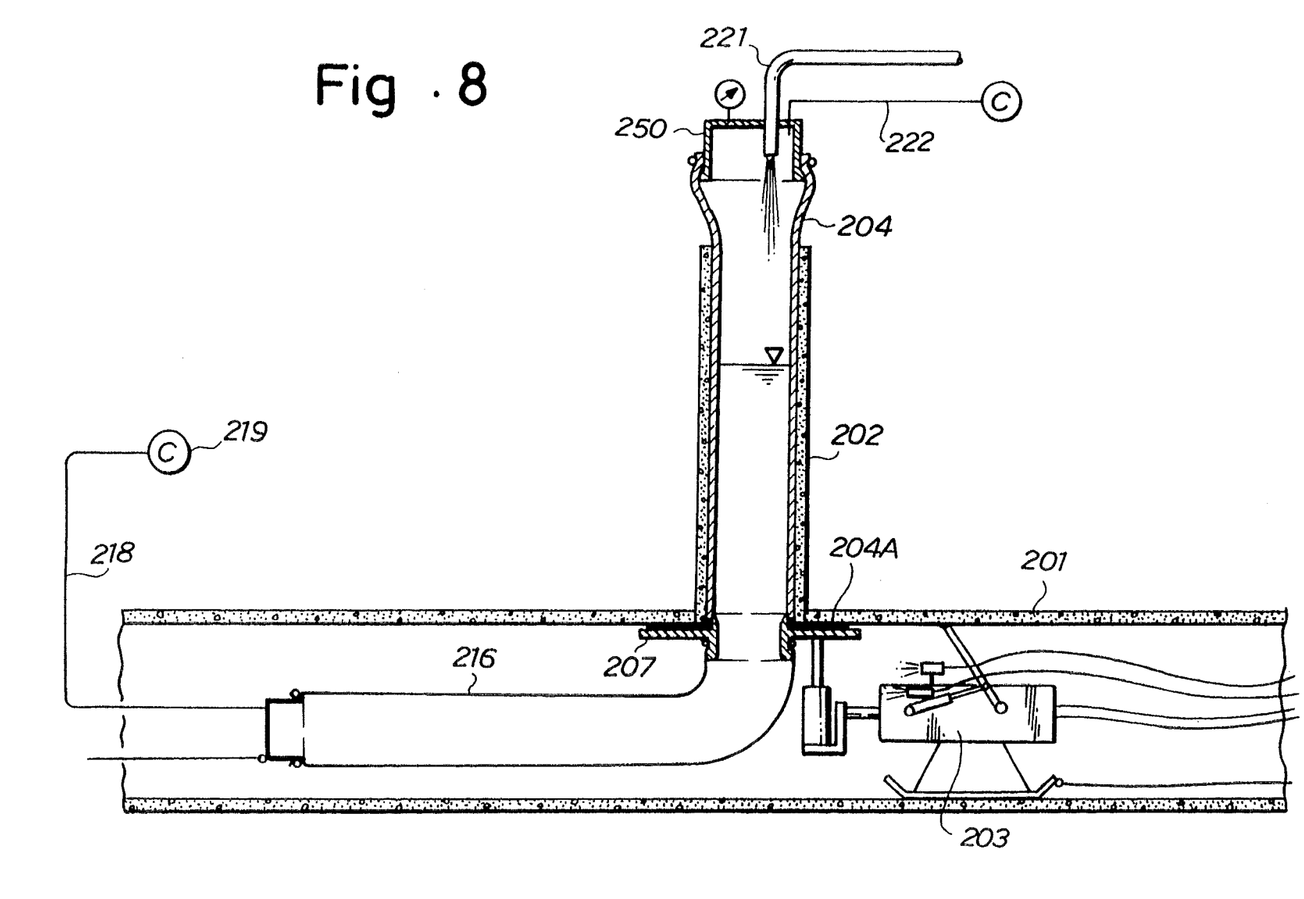
Figure 9:
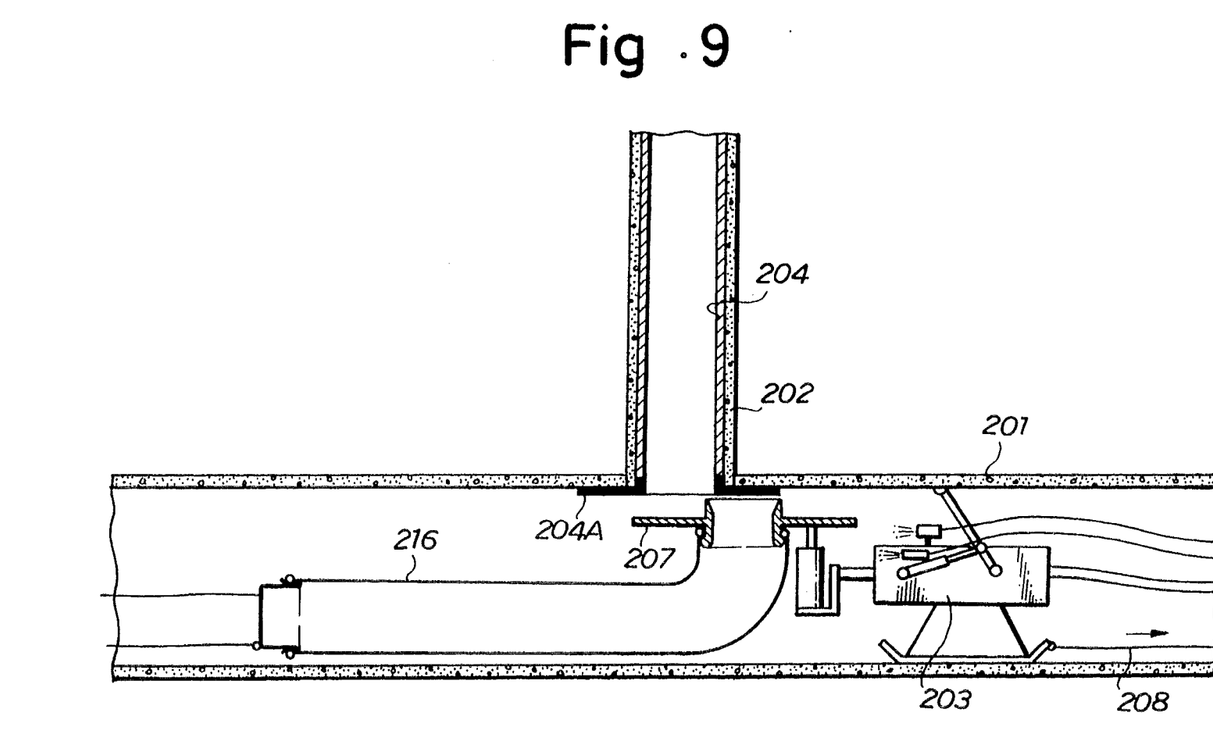

To solve this problem, a branch pipe lining method as shown in FIGS. 7-9 has been proposed.

More specifically, FIGS. 7-9 are cross-sectional views showing a conventional branch pipe lining method in the order of processes included therein. As shown in FIG. 7, this method utilizes a fluid pressure sealing nozzle 207 to provide an airtight connection between a pressure bag 216 and a branch pipe liner bag 204. More specifically, the fluid pressure sealing nozzle 207 is air-tight connected with a flange 204A formed on one end of the branch pipe liner bag 204 by one of sealing structures shown in FIGS. 10(a)-10(d).

These sealing structures will be explained below in detail with reference to FIGS. 10(a)-10(d).

Figure 10A:
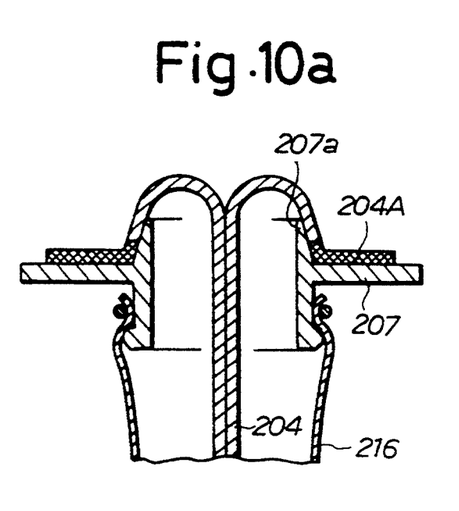
FIGS. 10(a)-10(d) are cross-sectional views showing sealing structures between a fluid pressure sealing nozzle and a branch pipe liner bag for providing air-tight connections.

In a sealing structure shown in FIG. 10(a), a fluid pressure sealing nozzle 207 is formed with a tapered protrusion 207a which is used to maintain an air-tight connection between the fluid pressure sealing nozzle 207 and the branch pipe liner bag 204.

Figure 10B:
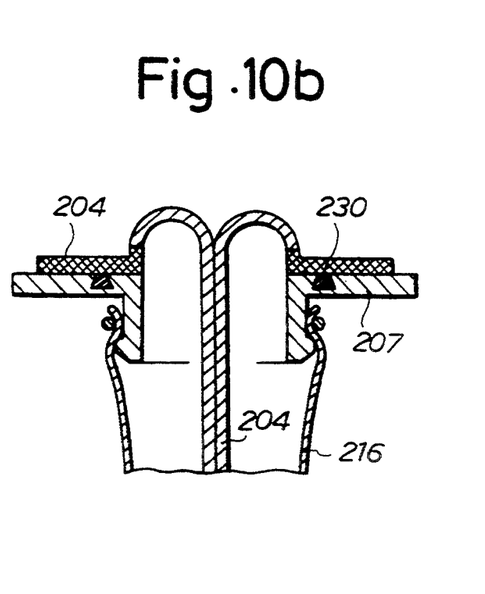
Figure 10C:
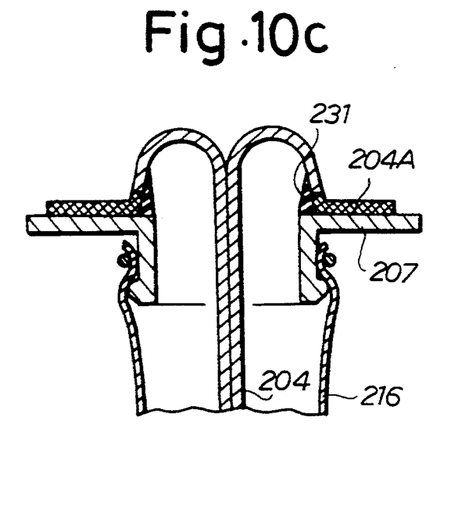

A sealing structure shown in FIG. 10(b) maintains an air-tight connection between the fluid pressure sealing nozzle 207 and the branch pipe liner bag 204 by means of an O-ring 230 provided in the fluid pressure sealing nozzle 207. Another sealing structure shown in FIG. 10(c) utilizes a valve 231 provided on the fluid pressure sealing nozzle 207 for realizing a similar air-tight connection.

Figure 10D:
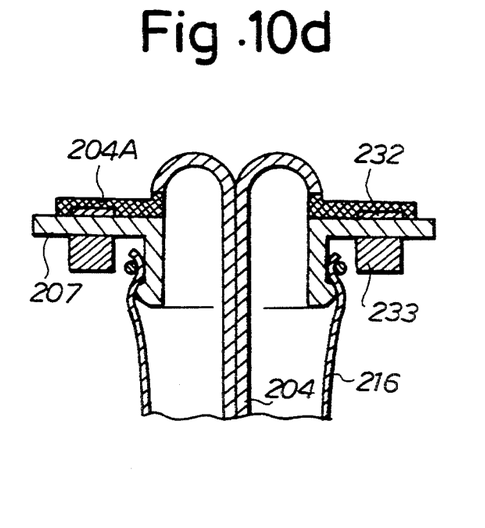

FIG. 10(d) shows a sealing structure for maintaining an air-tight connection between the fluid pressure sealing nozzle 207 and the branch pipe liner bag 204 by means of a magnetic plate 232 embedded in the flange 204A of the branch pipe liner bag 204 and a magnet 233 arranged on the nozzle 207 at a location opposing to the magnetic plate 232 such that the magnetic plate 232 and the magnet 233 attract to each other.

Now, referring back to FIG. 7, the flange 204A of the branch pipe liner bag 204, after accommodated in the pressure bag 216, is placed on the fluid pressure sealing nozzle 207. A working robot 203 is driven to press the flange 204A of the branch pipe liner bag 204 onto the inner wall of the main pipe 201 to provide a close contact therebetween. A compressor 209 is next driven to supply compressed air into the pressure bag 216 through an air hose 18 to cause the branch pipe liner bag 204 to evert by the action of the pressure of the compressed air and enter into the branch pipe 202 from the main pipe 201 toward the ground (in the upward direction). When the insertion of the branch pipe liner bag 204 has been completed over the whole length of the branch pipe 202, a pressure cap 250 is attached to the upper end of the branch pipe liner bag 204, as shown in FIG. 8. Through a hot water hose 221 and an air hose 222 connected to the cap 250, hot water and compressed air are respectively supplied into the branch pipe liner bag 204.

The branch pipe liner bag 204 is inflated by the pressure of the compressed air to be pressed against the inner wall of the branch pipe 202 as illustrated. Simultaneously, the supplied hot water provides the branch pipe liner bag 204 with heat so that a thermosetting resin impregnated in the liner bag 204 is hardened by the heat.

In this manner, the branch pipe liner bag 204 is hardened while it remains pressed against the inner wall of the branch pipe 202, whereby the inner wall surface of the branch pipe 202 is lined or repaired by the hardened branch pipe liner bag 204.

After the branch pipe liner bag 204 has been hardened, the working robot 203 is driven to lower the fluid pressure sealing nozzle 207 to release the fluid pressure sealing nozzle 207 from the flange 204A of the branch pipe liner bag 204.

Then, a pull rope 208 is pulled in the direction indicated by the arrow in FIG. 9 to move the working robot 203 in the same direction along the main pipe 101. This causes the fluid pressure sealing nozzle 207 and the pressure bag 216 to also move in the same direction for removal from the main pipe 101. Consequently, the hardened branch pipe liner bag 204 only remains on the inner wall of the branch pipe 202, thus completing a sequence of lining operations for the branch pipe 202.

As described above, this method does not need the sealing tube 140 as the method shown in FIG. 6 and accordingly removes the replacing operation of the sealing tube 140.

However, the sealing structures shown in FIGS. 10(a)-10(d) between the branch pipe liner bag 204 and the fluid pressure sealing nozzle 207, employed in the conventional branch pipe lining method described above, may sometimes have difficulties in constantly ensuring a sufficiently high sealability.

In addition to the problem mentioned above, the conventional method further implies an economical problem. Specifically explaining with reference FIG. 8, since the diameter of a space for access to generally used branch pipes is approximately $\phi 400$ m/m, which is smaller than the diameter of main pipes being approximately $\phi 900$ m/m, operations within the access space to the branch pipe is impossible or quite difficult to be performed. It is therefore necessary to employ a branch pipe liner bag long enough to reach the ground through the branch pipe such that associated operations may be done on the ground. For this reason, a branch pipe liner bag 204, long enough, is employed such that a pressure cap 250 is attached to the upper end thereof on the ground after it is everted and passed through the branch pipe to be repaired. Since this pressure cap 250 is provided with a hot water hose 221 and an air hose 222 mounted thereon, operations are troublesome. Moreover, this method requires a branch pipe liner bag which is longer than a branch pipe to be repaired by a length extending from the end of the branch pipe to the ground or a location where the associated operations are performed, which is not preferable in view of the economy.

OBJECTS AND SUMMARY OF THE INVENTION

It is therefore an object of the present invention to provide a branch pipe lining method which is capable of realizing a reliable air-tight connection between a branch pipe liner bag and a fluid pressure sealing nozzle with a simple structure to ensure that the branch pipe liner bag can usually be inserted into a branch pipe to be repaired.

It is another object of the present invention to provide a branch pipe lining method which is capable of simplifying operations associated therewith and of reducing the operation cost by saving the branch pipe liner bag.

To achieve the above objects, the present invention provides a method of lining a branch pipe using a branch pipe liner bag impregnated with a hardenable resin and having a flange at one end thereof, comprising the steps of: folding out the flange to mount the same to a fluid pressure sealing nozzle; holding a close contact between the flange and the fluid pressure sealing nozzle by vacuum pressure; everting the branch pipe liner bag and inserting the same from a main pipe into a branch pipe toward the ground by a fluid pressure; pressing the branch pipe liner bag onto the inner wall of the branch pipe by a fluid pressure; and hardening the hardenable resin impregnated in the branch pipe liner bag which is kept pressed onto the inner wall of the branch pipe.

Also, the method of the present invention further comprises the steps of: plunging a hot water pipe and an air pipe, both made of metal, into an upper end portion of the branch pipe liner bag after the branch pipe liner bag has been inserted into the branch pipe; supplying hot water and compressed air into the branch pipe liner bag respectively through the hot water pipe and the air hose; and heating the branch pipe liner bag by the hot water supplied thereto to harden the hardenable resin impregnated in the branch pipe liner bag, while the branch pipe liner bag is being pressed onto the inner wall of the branch pipe by the action of the compressed air supplied thereto.

According to the present invention, since the branch pipe liner bag is air-tight connected to the fluid pressure sealing nozzle by the flange thereof being attracted to the fluid pressure sealing nozzle by vacuum pressure, a high sealability is provided between them with a relatively simple structure. This sealability ensures to prevent a pressure liquid from leaking from the juncture between the branch pipe liner bag and the fluid pressure sealing nozzle, whereby the branch pipe liner bag is reliably everted and inserted into the branch pipe by the pressure liquid. When the flange and fluid pressure sealing nozzle are released from the close contact state after the branch pipe liner bag inserted into the branch pipe has been hardened, the fluid pressure sealing nozzle can be easily detached and removed from the branch pipe liner bag.

Also, according to the present invention, the hot water pipe and the air pipe, made of metal, are directly plunged into an upper end portion of the branch pipe liner bag in the process of hardening the branch pipe liner bag everted into the branch pipe 2. Hot water and compressed air are supplied into the branch pipe liner bag respectively through the hot water pipe and the air pipe, thus removing the necessity of employing a branch pipe liner bag long enough to reach the ground and of attaching a pressure cap on the upper end of the branch pipe liner bag. Therefore, the operations are made simpler, and the required material is saved which leads to a reduction in the operation cost of the branch pipe lining.

The above and other objects, advantages and features of the invention will appear more fully hereinafter in the following description given in connection with the accompanying drawings and the novelty thereof pointed out in the appended claims.

DESCRIPTION OF THE PREFERRED EMBODIMENT

The present invention will hereinafter be described in connection with a preferred embodiment thereof with reference to the accompanying drawings.

Figure 1:
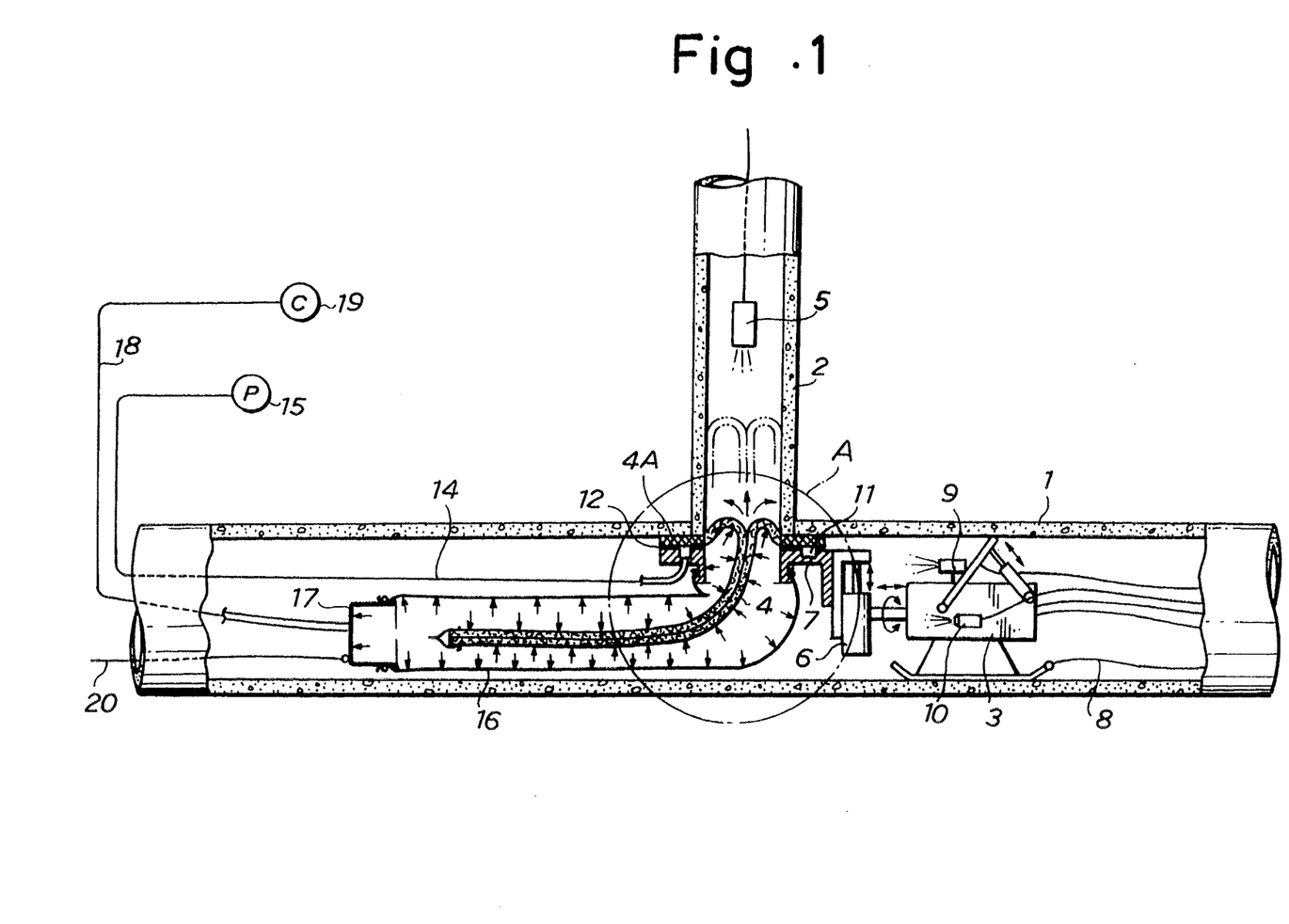
FIGS. 1-3 are cross-sectional views showing a branch pipe lining method according to the present invention in the order of processes thereof.
Figure 2:
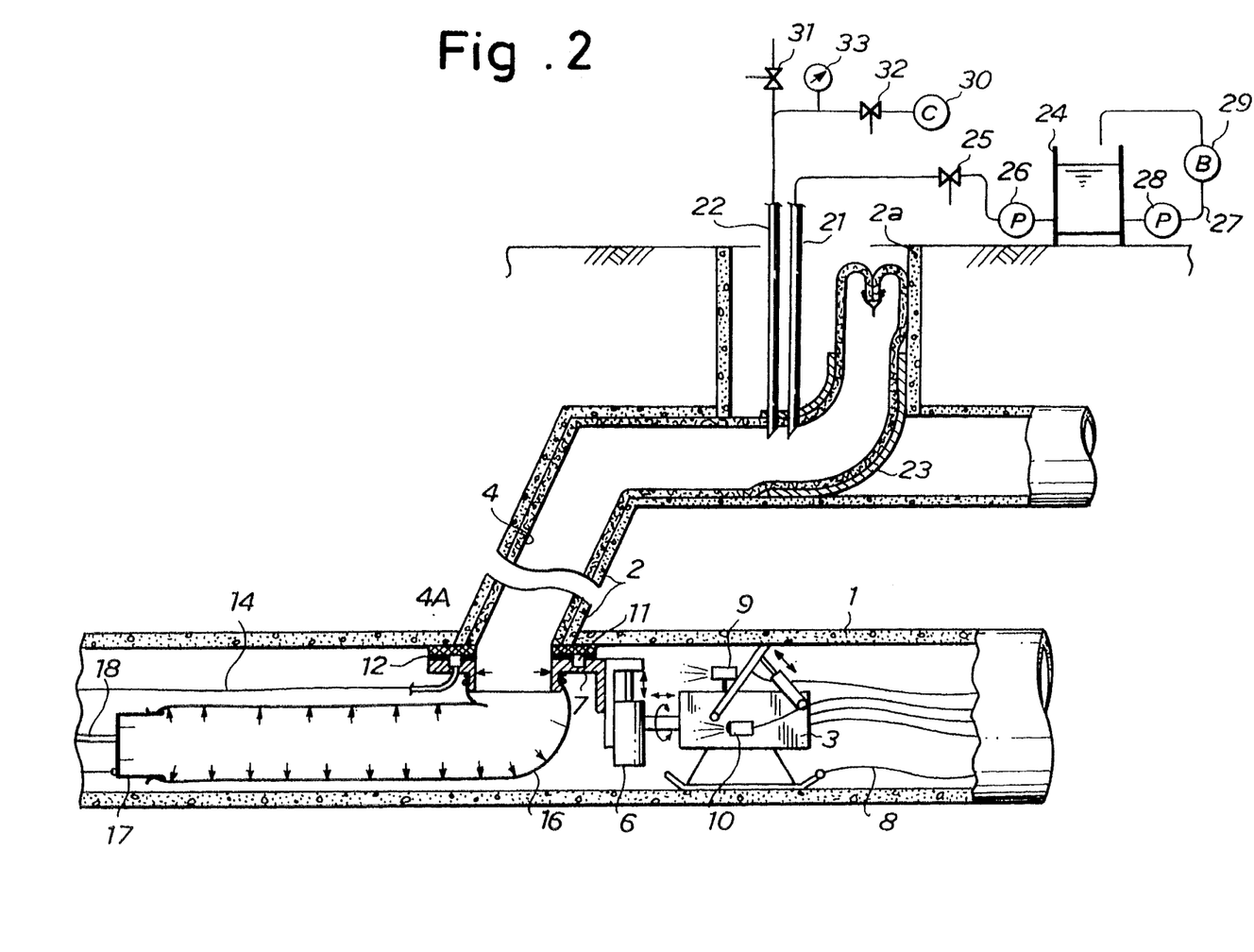
Figure 3:
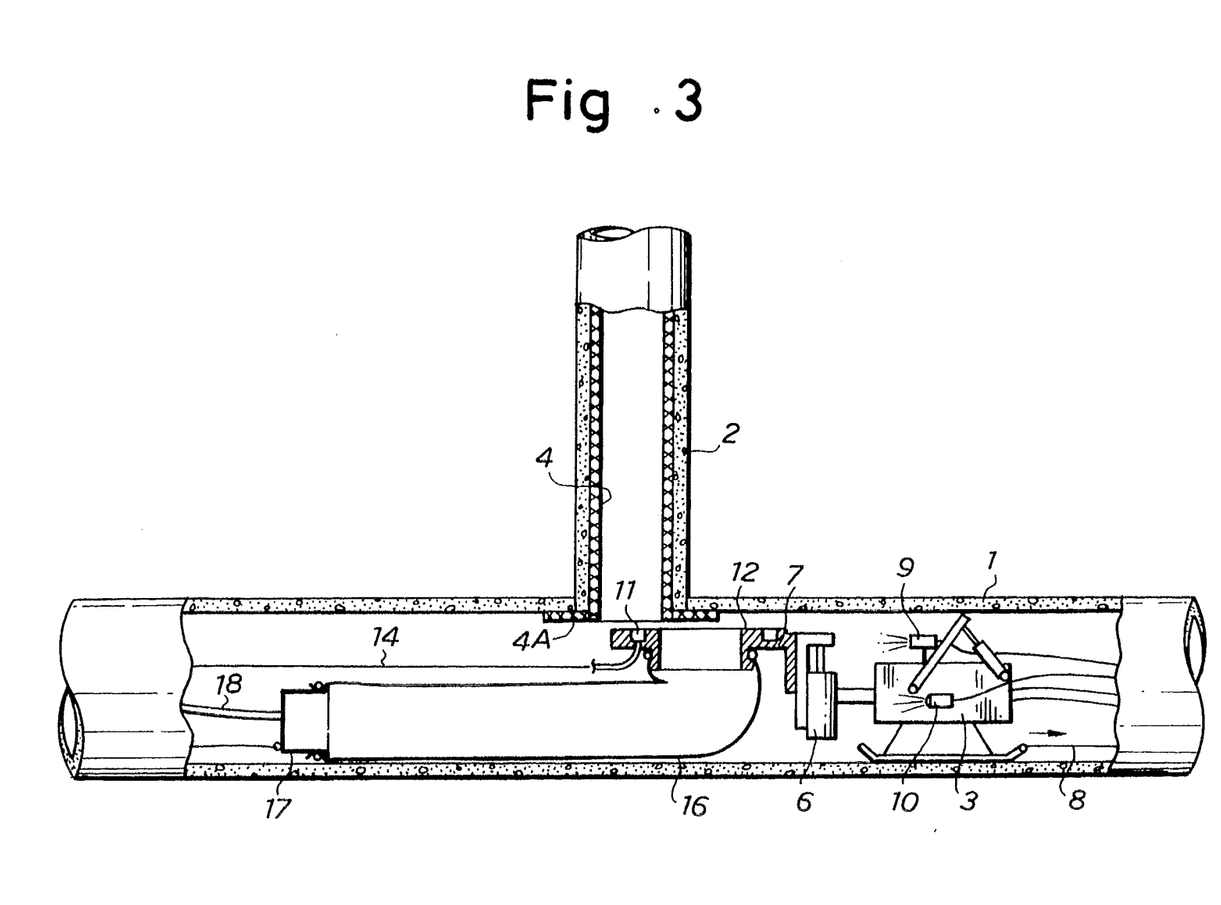
Figure 4:
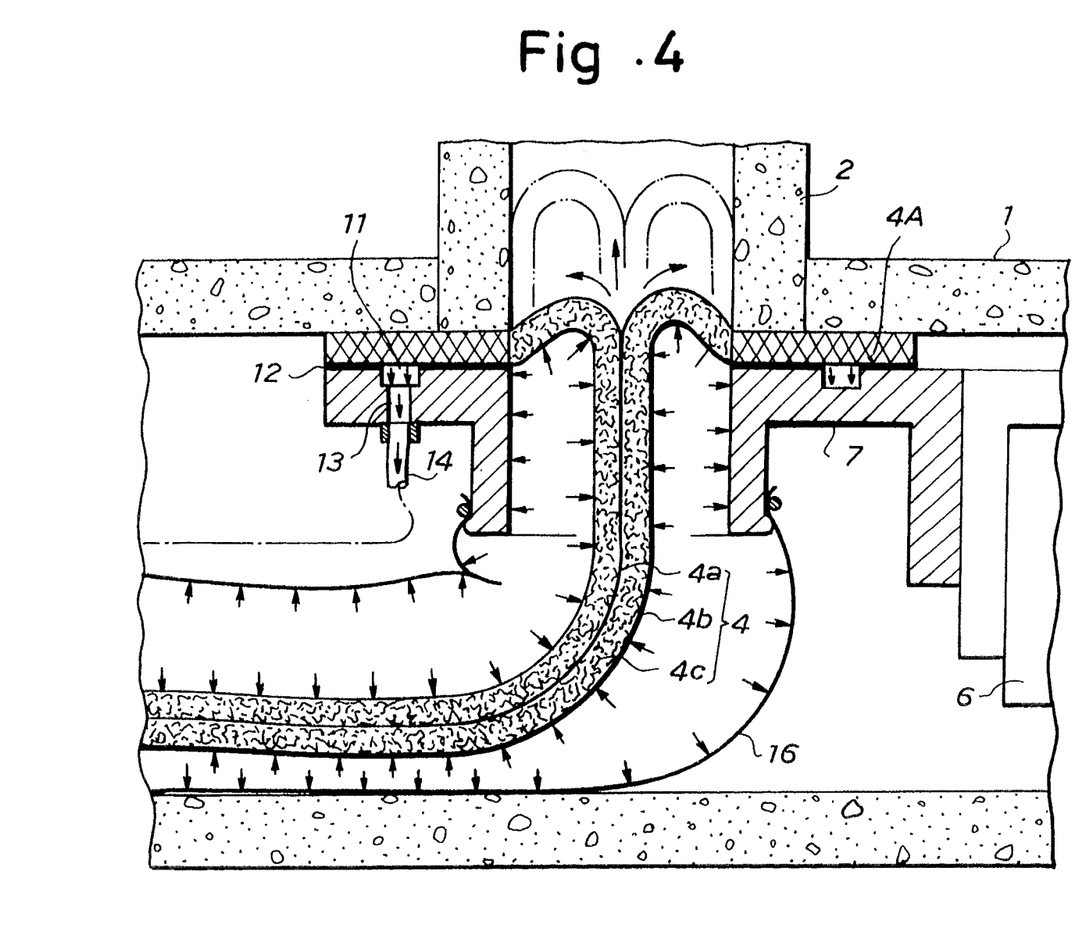
FIG. 4 is an enlarged view showing a portion A in FIG. 1 in greater detail.

FIGS. 1-3 are cross-sectional views showing one embodiment of a method according to the present invention in the order of processes included therein. FIG. 4 is an enlarged view showing a portion A in FIG. 1 in greater detail, and FIG. 5 is a plan view of a fluid pressure sealing nozzle.

In the drawings, there are illustrated a main pipe 1 and a branch pipe 2 which has a smaller diameter than the main pipe 1 and is branched from the same. A robot 3, a branch pipe liner bag 4 and so on are placed in the main pipe 1, while a TV camera 5 for monitoring the inside of the branch pipe 21 is suspended from the above for monitoring operations performed in the branch pipe 2.

The robot 3 is a hydraulically driven type and has a head 6 arranged for hi-directional movements, i.e., in the upward and downward directions, as well as for rotation in the direction indicated by the arrow. The head 6 also supports a fluid pressure sealing nozzle 7. The robot 3 is tied with pull rope 8 and further is equipped on the top surface thereof with a TV camera 9 for monitoring the inside of the main pipe and a lamp 10 for illumination.

Figure 5:
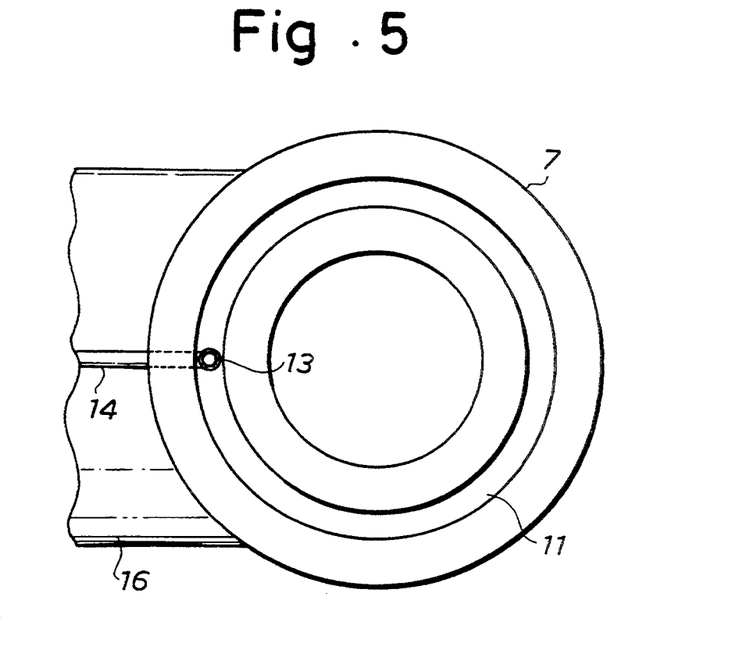
FIG. 5 is a plan view of a fluid pressure sealing nozzle employed in the present invention.

As shown in FIGS. 4 and 5, the fluid pressure sealing nozzle 7 has an upper surface (contact surface) formed with an annular groove 11. On the upper surface except for the annular groove 11, a packing 12 is attached. The groove 11 communicates with a vacuum pump 15 shown in FIG. 1 through a communicating hole 13, which is bored through one location of the groove 11, and a vacuum hose 14 connected to the communicating hole 13.

To the fluid pressure sealing nozzle 7, the branch pipe liner bag 4 is mounted. More specifically, the branch pipe liner bag 11 is formed of a tubular unwoven fabric member 4c impregnated with an unhardened thermosetting resin and having the outer surface covered with a highly sealable plastic films 4a, 4b. One end of the branch pipe liner bag 4 is folded back to form a flange 4A, as illustrated, which is set on the upper surface of the fluid pressure sealing nozzle 7.

The thermosetting resin impregnated in the flange 4a has previously been hardened such that the flange 4A can maintain its predetermined shape (i.e., the flange 4A has an arcuate surface in conformity to the shape of the inner wall of the main pipe 1). The plastic films 4a, 4b covering the tubular unwoven fabric member 4c may comprise a film made of polyethylene, vinyl chloride, vinylon, polyurethane, nylon, polypropylene, polyethylene/nylon co-polymer or the like. Materials suitable to the tubular unwoven fabric member 4c may include polyester, nylon, acrylic resin, and vinylon. Also, the thermosetting resin may be unsaturated polyester, epoxy resin or the like.

The branch pipe liner bag 4 with its flange 4A mounted on the upper surface of the fluid pressure sealing nozzle 7 has the remaining uneverted portion extending through the nozzle 7 into a pressure bag 16 for everting the branch pipe liner bag 4, as shown in FIG. 1.

The pressure bag 16 has one end thereof mounted to the fluid pressure sealing nozzle 7 and the other end closed by a cap 17. The pressure bag 16 is also connected to a compressor 19 through an air hose 18. The cap 17 is tied to one end of a pull rope 20.

Next, the branch pipe lining method according to the present invention will be explained with reference to FIGS. 1-3.

The vacuum pump 15, when driven, causes the groove 11 formed in the upper surface of the fluid pressure sealing nozzle 7 to be evacuated through the communicating hole 13 and the vacuum hose 14, resulting in the flange 4A of the branch pipe liner bag 4A set on the upper surface of the fluid pressure sealing nozzle 7 being attracted to the upper surface of the fluid pressure sealing nozzle 7 by a negative pressure developed in the groove 11. In this embodiment, since the packing 12 is arranged between the flange 4A and the fluid pressure sealing nozzle 7, the branch pipe liner bag 4 and the fluid pressure sealing nozzle 7 are air-tight connected by virtue of the packing 12. It will be appreciated that a high sealability is ensured between them with a simple structure.

Pulling the pull ropes 8, 20 causes the working robot 3 as well as the branch pipe liner bag 4, the pressure bag 16 and so on supported by the robot 3 to integrally move in the main pipe 1. As the insides of the main pipe 1 and the branch pipe 2 are being monitored by the TV cameras 5, 10, the flange 4A of the branch pipe liner bag 4 is positioned at an opening communicating with the branch pipe 2, as shown in FIG. 1. Then, the head 6 of the robot 3 is moved upward to press the flange 4A of the branch pipe liner bag 4 onto the inner wall of the main pipe 1 such that the flange 4A is closely contacted to the inner wall of the main pipe 1.

The compressor 19 is next driven to supply compressed air into the pressure bag 16 through the air hose 18, so that the branch pipe liner bag 4 is everted by the pressure of the compressed air and is successively inserted from the main pipe 1 into the branch pipe 2 toward the ground (in the upward direction). In this event, since a high sealability is ensured between the branch pipe liner bag 4 and the fluid pressure sealing nozzle 7 by the packing 12, the compressed air is prevented from leaking therebetween, with the result that the branch pipe liner bag 4 is reliably inserted into the branch pipe 2 by the compressed air.

When the branch pipe liner bag 4 has been inserted into the whole length of the branch pipe 2, a hot water pipe 21 and an air pipe 22, for example, made of metal, are plunged into an upper portion of the branch pipe liner bag 4. In an access space 2a to the branch pipe 2, an elbow-shaped lining bag guide 23 for guiding the branch pipe liner bag 4 has circular holes previously formed therethrough which have diameters substantially equal to or slightly larger than the outer diameters of the hot water pipe 21 and the air pipe 22, respectively. Thus, the hot water pipe 21 and the air pipe 22 are directly plunged into the branch pipe liner bag 4 through these circular holes.

The hot water pipe 21 is connected to a lower portion of a hot water bath 24 provided on the ground as illustrated, and a valve 25 for adjusting the flow rate of hot water and a hot water pump 26 for delivering the hot water to the branch pipe liner bag 4 are disposed in the midway of the hot water pipe 21. Further, a hot water pipe 27 has one end connected to a lower portion of the hot water bath 24 and the other open end placed opposite to the surface of hot water stored in the water bath 24. A hot water pump 28 and a boiler 29 are disposed in the midway of the hot water pipe 27. The air pipe 22 is connected to a compressor 30, and is further provided with a valve 31 for air purge, a valve 32 for adjusting the pressure and flow rate, and a pressure gauge 33 which are disposed in the midway of the air pipe 22.

In the state illustrated in FIG. 2, the compressor 30 is driven to supply compressed air into the branch pipe liner bag 4 through the air pipe 22, while the hot water pump 26 and the boiler 29 are driven to supply hot water stored in the hot water bath 24 into the branch pipe liner bag 4. This causes the branch pipe liner bag 4 to inflate by the pressure of the compressed air supplied thereto, so that the branch pipe liner bag 4 is pressed onto the inner wall of the branch pipe 2. Simultaneously, the branch pipe liner bag 4 is heated by the hot water supplied thereto, whereby the thermosetting resin impregnated therein is hardened by this heat.

In this manner, the branch pipe liner bag 4 is hardened while it remains pressed onto the inner wall of the branch pipe 2, with the result that the inner wall of the branch pipe 2 is lined by the hardened branch pipe liner bag 4, thus completing the repair operation.

In the hot water bath 24, hot water has been prepared by the boiler 29 before it is to be supplied into the branch pipe liner bag 4. Specifically, hot water in the bath 24, even if it is cooled, is delivered to the boiler 29 by the hot water pump 28 to be heated to a predetermined temperature, and then fed back to the hot water bath 24. Thus, hot water is always ready to be supplied to the branch pipe liner bag 4.

In this embodiment as described above, for hardening the branch pipe liner bag 4 everted into the branch pipe 2, the hot water pipe 21 and the air pipe 22, made of metal, are directly plunged into an upper end portion of the branch pipe liner bag 4. Hot water and compressed air are supplied into the branch pipe liner bag 4 respectively through the hot water pipe 21 and the air pipe 22, thus removing the necessity of employing a branch pipe liner bag long enough to reach the ground and of attaching a pressure cap on the upper end of the branch pipe liner bag. Therefore, the operations are made simpler, and no branch pipe liner bag longer than a branch pipe to be repaired is required, which results in saving the required material and reducing the operation cost of the branch pipe lining.

After the branch pipe 2 has been lined with the hardened branch pipe liner bag 4 adhered to the inner surface thereof, hot water and compressed air supplied into the branch pipe liner bag 4 are extracted therefrom. Then, when the vacuum pump 15 is stopped, the flange 4A of the branch pipe liner bag 4 is easily released from the fluid pressure sealing nozzle 7.

Afterward, when the working robot 3 is driven to lower the head 6 thereof together with the fluid pressure sealing nozzle 7 supported by the head 6, as shown in FIG. 3, the branch pipe liner bag 4 is easily removed from the flange 4A. In this state, the pull rope 8 is pulled in the direction indicated by the arrow, to move the working robot 3 in the same direction along the main pipe 1 such that the fluid pressure sealing nozzle 7 and the pressure bag 16 are also transported in the same direction and removed from the main pipe 1. Finally, the hardened branch pipe lines bag 4 alone remains on the inner wall of the branch pipe 2, thus completing a sequence of lining operations performed fox the branch pipe 2.

As will be understood from the description given above, according to the present invention, a branch pipe liner bag impregnated with a hardenable resin and having a flange at one end thereof is used for the branch pipe repair. The flange of the branch pipe liner bag is folded out to be mounted to a fluid pressure sealing nozzle. A close contact between the flange and the fluid pressure sealing nozzle is held by vacuum pressure. The branch pipe liner bag is then everted and inserted from a main pipe into a branch pipe toward the ground by a fluid pressure. The branch pipe liner bag is pressed onto the inner wall of the branch pipe by a fluid pressure, and the hardenable resin impregnated in the branch pipe liner bag is hardened while the bag itself is kept pressed onto the inner wall of the branch pipe. In this manner, an air-tight connection between the branch pipe lines bag and the fluid pressure sealing nozzle can be reliably provided by a simple structure, which allows the branch pipe liner bag to be inserted into the branch pipe without any leak from the conjuncture between the branch pipe liner bag and the fluid pressure sealing nozzle.

Also, according to the present invention, a hot water pipe and an air pipe, made of metal, is plunged into an upper end portion of the branch pipe liner bag after the branch pipe liner bag has been inserted into the branch pipe. Hot water and compressed air are supplied into the branch pipe liner bag respectively through these hot water pipe and air hose, such that the branch pipe liner bag is heated by the hot water supplied thereto in order to harden the hardenable resin impregnated in the branch pipe liner bag, while the branch pipe liner bag is being pressed onto the inner wall of the branch pipe by the action of the compressed air supplied thereto. This results in simpler operations associated with the lining and cost reduction by using a branch pipe liner bag having a length substantially equal to the length of a branch pipe to be repaired instead of a much longer one which would be required by the conventional method for performing the associated operations on the ground.

While the invention has been described in connection with its preferred embodiment, it is to be understood that modifications will occur to those skilled in the art without departing from the spirit of the invention. The scope of the invention is therefore to be determined solely by the appended claims.

What is claimed is:

1. A method of lining a branch pipe using a branch pipe liner bag impregnated with a hardenable resin and having a flange at one end thereof, comprising the steps of:
    folding out said flange to mount the same to a fluid pressure sealing nozzle;
    holding a close contact between said flange and said fluid pressure sealing nozzle by vacuum pressure;
    everting said branch pipe liner bag and inserting the same from a main pipe into a branch pipe toward the ground by a fluid pressure;
    pressing said branch pipe liner bag onto the inner wall of said branch pipe by a fluid pressure; and
    hardening said hardenable resin impregnated in said branch pipe liner bag which is kept pressed onto the inner wall of said branch pipe.

2. A method according to claim 1, wherein said fluid pressure sealing nozzle has a contact surface formed with an annular groove, and said annular groove is evacuated to hold the close contact between said flange and said fluid pressure sealing nozzle by vacuum pressure.

3. A method according to claim 1, wherein said hardenable resin impregnated in said branch pipe liner bag is a thermosetting resin, and said hardening step includes heating said hardenable resin to harden the same.

4. A method according to claim 3, wherein said hardenable resin is heated by supplying hot water into said branch pipe liner bag.

5. A method according to claim 1, wherein a packing is attached on said contact surface of said fluid pressure sealing nozzle.

6. A method according to claim 1, further comprising the steps of:
    plunging a hot water pipe and an air pipe into an upper end portion of said branch pipe liner bag after said branch pipe liner bag has been inserted into said branch pipe;
    supplying hot water and compressed air into said branch pipe liner bag respectively through said hot water pipe and said air hose; and
    heating said branch pipe liner bag by the hot water supplied thereto to harden said hardenable resin impregnated in said branch pipe liner bag, while said branch pipe liner bag is being pressed onto the inner wall of said branch pipe by the action of the compressed air supplied thereto.

7. A method according to claim 6, wherein said hot water pipe and said air pipe are made of metal.

8. A method according to claim 2, wherein a packing is attached on said contact surface of said fluid pressure sealing nozzle.

9. A method according to claim 2, further comprising the steps of:
    plunging a hot water pipe and an air pipe into an upper end portion of said branch pipe liner bag after said branch pipe liner bag has been inserted into said branch pipe;
    supplying hot water and compressed air into said branch pipe liner bag respectively through said hot water pipe and said air hose; and
    heating said branch pipe liner bag by the hot water supplied thereto to harden said hardenable resin impregnated in said branch pipe liner bag, while said branch pipe liner bag is being pressed onto the inner wall of said branch pipe by the action of the compressed air supplied thereto.

10. A method according to claim 5, further comprising the steps of:
    plunging a hot water pipe and an air pipe into an upper end portion of said branch pipe liner bag after said branch pipe liner bag has been inserted into said branch pipe;
    supplying hot water and compressed air into said branch pipe liner bag respectively through said hot water pipe and said air hose; and
    heating said branch pipe liner bag by the hot water supplied thereto to harden said hardenable resin impregnated in said branch pipe liner bag, while said branch pipe liner bag is being pressed onto the inner wall of said branch pipe by the action of the compressed air supplied thereto.

11. A method according to claim 8, further comprising the steps of:
    plunging a hot water pipe and an air pipe into an upper end portion of said branch pipe liner bag after said branch pipe liner bag has been inserted into said branch pipe;
    supplying hot water and compressed air into said branch pipe liner bag respectively through said hot water pipe and said air hose; and
    heating said branch pipe liner bag by the hot water supplied thereto to harden said hardenable resin impregnated in said branch pipe liner bag, while said branch pipe liner bag is being pressed onto the inner wall of said branch pipe by the action of the compressed air supplied thereto.

12. A method according to claim 9, wherein said hot water pipe and said air pipe are made of metal.

13. A method according to claim 10, wherein said hot water pipe and said air pipe are made of metal.

14. A method according to claim 11, wherein said hot water pipe and said air pipe are made of metal.

* * * * *